UNITED STATES PATENT OFFICE.

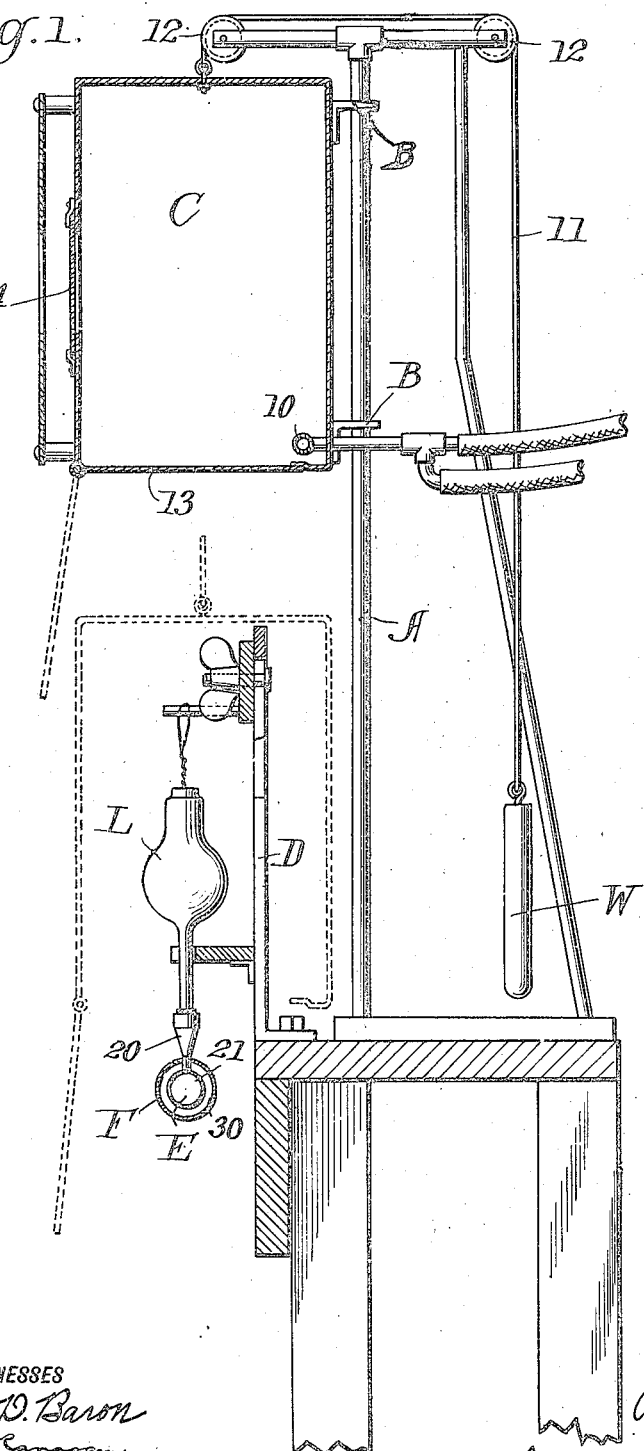

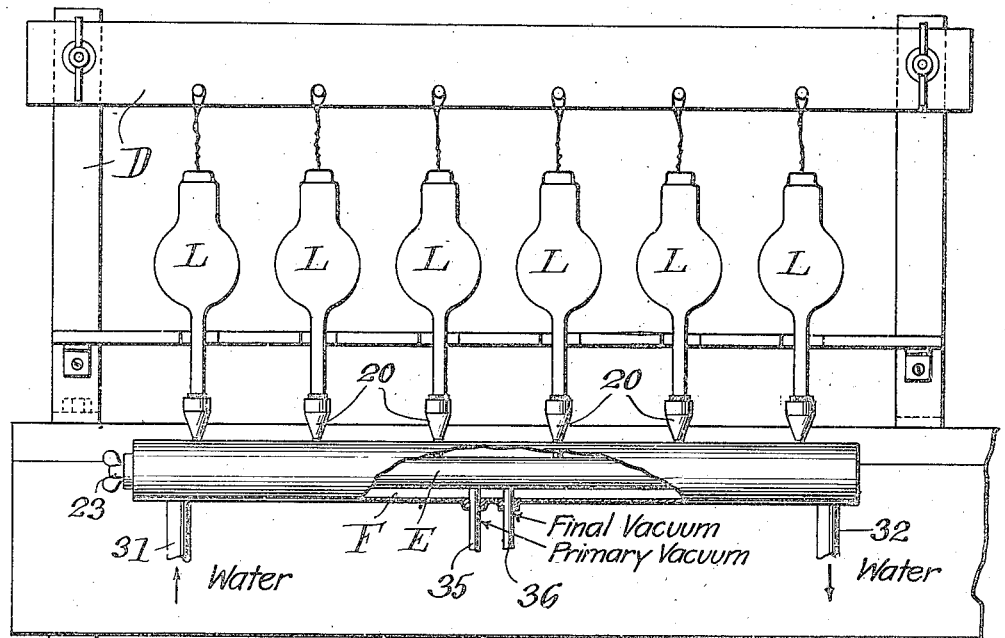
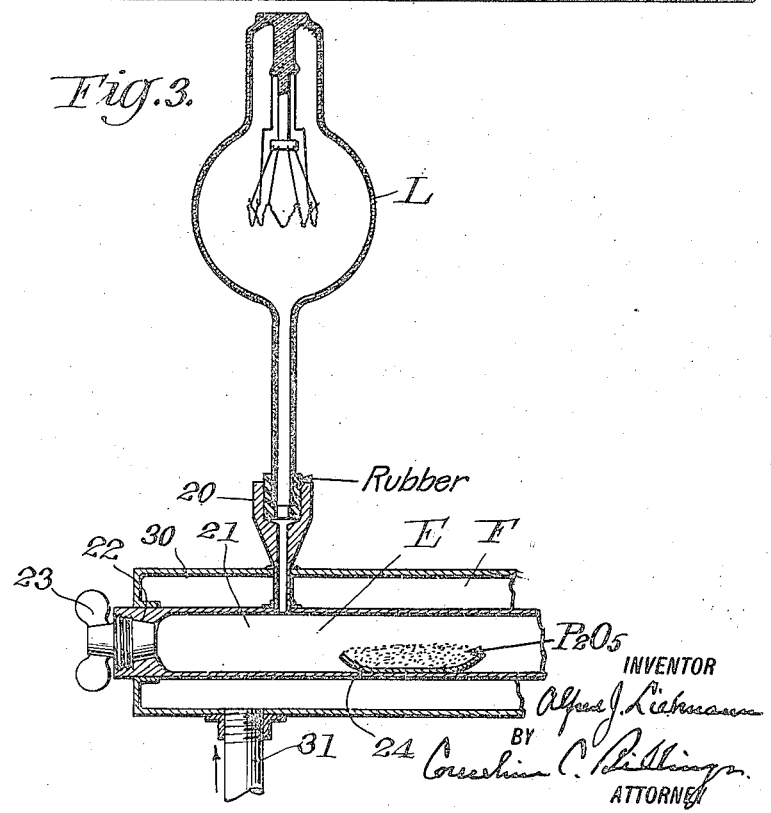

ALFRED J. LIEBMANN, OF NEW YORK, N. Y., ASSIGNOR TO INDEPENDENT LAMP & WIRE COMPANY, INC., OF WEEHAWKEN, NEW JERSEY, A CORPORATION OF NEW JERSEY.

METHOD AND APPARATUS FOR ELIMINATING MOISTURE FROM EVACUATED SPACES.

1,200,122. Specification of Letters Patent. Patented Oct. 3, 1916.

Application filed May 17, 1915. Serial No. 28,588.

*To all whom it may concern:*

Be it known that I, ALFRED J. LIEBMANN, a citizen of Switzerland, and a resident of the borough of Manhattan, city, county, and State of New York, have invented certain new and useful Improvements in Methods and Apparatus for Eliminating Moisture from Evacuated Spaces, set forth in the annexed specification.

It is well known that the life of an incandescent electric lamp in defined as the time that the filament will burn before it disintegrates and causes a blackening of the glass bulb.

For a long time it has been well known that this disintegration sets in much more quickly and is much more perceptible if there is some water vapor left in the lamp bulb during the process of its manufacture. It has heretofore been practically impossible to prevent the existence of traces of water vapor in a lamp bulb during the manufacture of a lamp and it has been and is the task of the manufacturer to endeavor to remove the water vapor during the so-called exhaust process. It is well known that water vapor has very strong adhesive properties to glass and that even if the glass bulb has been heated to a temperature considerably above the evaporation point of water, that is above 100° C., it is found that water vapor in small amounts still adheres to the glass bulb. In order to remove as much of the water vapor as possible, it has heretofore been the practice to heat the glass bulbs during the exhaust process to a temperature as high as possible without softening the glass of the bulb. In order to facilitate the removal of this water vapor, it has been the practice of those skilled in the art, to bring a substance of moisture absorbing quality, such as phosphor pentoxid ($P_2O_5$) in proximity to the lamp, preferably in flat boats.

In carrying out my invention, I have taken advantage of the well known fact that water vapor will readily travel from a hot place to a cold place and condense in the cold place. I have made use of this property in my present invention by creating a great difference in temperature between the space to be exhausted and freed from moisture, and the space in which the drying substance is preferably kept. To this end, I bring an inclosed space which is kept at a comparatively low temperature very close to the bulbs or vessels which are to be exhausted and which are to be made free from moisture, and hermetically connect the one with the other. A very strong sucking effect is exerted on the moisture remaining in the bulbs or vessels which will be carried from the interior of the bulbs or vessels to the interior of the cold chamber and will be condensed therein in the smallest dew drops. This effect is heightened when the drying substance, mentioned above, is kept in the cold chamber and further facilitated by the creation of the vacuum by means of an exhaust, as well known in the art.

Referring to the drawings which form a part of this specification; Figure 1 is a vertical view in section of a conventional form of apparatus used in the carrying out of my process, the lamp bulbs being shown in elevation. Fig. 2 is a front elevation of the apparatus, a section of the manifold being broken away and a series of lamps and connections to the cooling chamber. Fig. 3 is a detail in section showing a lamp bulb connected to the cooling chamber.

Like reference letters refer to like parts in the several views.

A is a support secured to which is a frame B upon which is slidingly mounted a gas oven C so arranged as to be lowered upon a series of lamps L mounted upon a support or frame D.

E is an exhaust chamber and F the cooling chamber surrounding said exhaust chamber. The oven is provided with a gas burner 10 and it is supported by a chain 11 passing over pulleys 12 mounted on the top of the supporting frame to which chain is attached a weight W to counter-balance the oven. The oven is of usual construction with a door 13 at the bottom and a translucent plate 14 on the side for inspection purposes. A series of lamps to be operated upon are mounted as indicated in Fig. 2 upon the frame, the lower ends of the lamps being hermetically sealed to nipples 20 extending from the exhaust chamber 21, which chamber is provided with an open end 22 preferably closed by a stopper 23. In the exhaust chamber are boats 24 containing the drying substance $P_2O_5$.

30 represents the cooling chamber surrounding the exhaust chamber, the nipples extending from the exhaust chamber being brazed to the cooling chamber and passing through the same. Inlet and outlet pipes 31 and 32 are placed at convenient points upon the cooling chamber. Pipes 35 for primary vacuum and 36 for the final vacuum are secured to the exhaust chamber.

In carrying out my invention, I attach as usual a multitude of lamps to a manifold exhaust chamber in which the drying substance $P_2O_5$ is kept and exhaust these lamps when heated by placing a gas heated oven over or around them.

My improvement consists in the application to this manifold of a surrounding cooling jacket. It would be possible to keep the manifold cold by other means, as for instance an air blast of some kind. In order to obtain an especially high vacuum and a very complete removal of the moisture, the chamber could be kept cold by the flowing of a substance of still lower temperature than water so that the exhaust chamber would be surrounded by a cooling agent of still higher qualities, as for instance liquid ammonia, carbon dioxid or even liquid air. I have found, however, that it is very practical and highly effective in the treatment of incandescent lamps to simply use a water jacket.

It is obvious that this invention is not confined to the exhaust and to the removal of water vapor from incandescent lamp bulbs, but the same method is effective for other appliances, as for instance in the manufacture of vacuum bottles, X-ray tubes and the like.

What I claim as new and desire to secure by Letters Patent, is:—

1. The method of freeing incandescent lamp bulbs from moisture and air which consists in heating the said bulbs, and causing the bulbs to be evacuated through an evacuated cooling chamber.

2. The method of freeing incandescent lamp bulbs from moisture which consists only in heating the said bulbs and causing the bulbs to be evacuated through a cooling chamber.

3. The method of freeing incandescent lamp bulbs from moisture which consists in heating the said bulbs and causing the bulbs to be evacuated through an evacuated cold chamber.

4. The method of producing a vacuum in lamp bulbs which consists in hermetically connecting the interior of the lamp bulb to the interior of an exhaust chamber and causing the gas and vapor contents of the heated lamp bulb to be exhausted through a cooling chamber.

5. In an apparatus of the class described, a vessel to be evacuated, an exhaust chamber, means for hermetically connecting the two together, means for heating the vessel and means for cooling the exhaust chamber.

6. In an apparatus of the class described, a vessel to be evacuated, an exhaust chamber closely adjacent thereto, means for hermetically connecting the two together, means for heating the vessel and means for cooling the exhaust chamber.

In witness whereof I have hereunto set my hand at the borough of Manhattan, city, county and State of New York, this third day of May, 1915.

ALFRED J. LIEBMANN.

In presence of—
ISABEL R. RICHARDS,
JOHN J. RANAGAN.